US011751588B2

(12) United States Patent
Ferreira et al.

(10) Patent No.: US 11,751,588 B2
(45) Date of Patent: Sep. 12, 2023

(54) **OBTENTION OF A SOLUTION FROM EXTRACTS OF *ROSMARINUS OFFICINALIS* L. FOR USE AS A FOOD COATING**

(71) Applicant: INSTITUTO POLITECNICO DE BRAGANCA, Bragança (PT)

(72) Inventors: Isabel C. F. R. Ferreira, Braganca (PT); Marcio Soares Carocho, Agueda (PT); Lillian Barros, Braganca (PT)

(73) Assignee: INSTITUTO POLITECNICO DE BRAGANCA, Braganca (PT)

( * ) Notice: Subject to any disclaimer, the term of this patent is extended or adjusted under 35 U.S.C. 154(b) by 807 days.

(21) Appl. No.: 16/503,787

(22) Filed: Jul. 5, 2019

(65) Prior Publication Data
US 2020/0022388 A1 Jan. 23, 2020

(30) Foreign Application Priority Data
Jul. 18, 2018 (PT) .......................... 110859

(51) Int. Cl.
*A23L 3/3472* (2006.01)
*A23L 17/60* (2016.01)
*A23L 3/3544* (2006.01)
*A23L 3/358* (2006.01)
*B01D 11/02* (2006.01)

(52) U.S. Cl.
CPC ............ *A23L 3/3472* (2013.01); *A23L 3/358* (2013.01); *A23L 3/3544* (2013.01); *A23L 17/60* (2016.08); *B01D 11/0288* (2013.01); *A23V 2002/00* (2013.01)

(58) Field of Classification Search
None
See application file for complete search history.

(56) References Cited

U.S. PATENT DOCUMENTS 6,299,915 B1 * 10/2001 Nussinovitch ......... A01N 65/00
426/89
2005/0196445 A1 * 9/2005 Augello ................ A23P 20/105
424/472

(Continued)

OTHER PUBLICATIONS

Ecosostenibile, Rosmarinus Officinalis, Un Mondo Ecosostenibile, accessed: Dec. 30, 2021 <https://antropocene.it/en/2017/05/20/rosmarinus-officinalis/> (Year: 2017).*

(Continued)

*Primary Examiner* — Viren A Thakur
*Assistant Examiner* — Thanh H Nguyen
(74) *Attorney, Agent, or Firm* — Lucas & Mercanti, LLP

(57) ABSTRACT

A process to obtain a semi-solid solution to be used as a food coating, obtained from extracts of rosemary and other antioxidant components is disclosed. This process shows various advantages, namely, the obtention of the rosemary extract, which main components are rosmarinic and carnosic acid, and carnosol, are obtained easily without the use of polluting solvents, and showing a good yield and a strong antioxidant capacity. The coating solution has few ingredients and all of them are harmless to human health, beyond being cheap and easy to obtain, allowing the preservation of food in a natural way, without needing additional processing or plastics, in line with many studies that refer this tendency in consumers.

4 Claims, 4 Drawing Sheets

(56) References Cited

U.S. PATENT DOCUMENTS

| | | | | |
|---|---|---|---|---|
| 2013/0029012 A1* | 1/2013 | Girard | ............... | A23L 19/05 426/103 |
| 2013/0115285 A1* | 5/2013 | Van Ness | ............... | A61K 47/36 424/463 |
| 2015/0299516 A1* | 10/2015 | Tran | ............... | A23L 27/84 106/135.1 |

OTHER PUBLICATIONS

Miskiewicz et al., The effects of baking conditions on acrylamide content in shortcrust cookies with added freeze-dried aqueous rosemary extract, Springer, <https://link.springer.com/article/10.1007/s13197-018-3349-x> (Year: 2018).*

Evidentiary reference Harvard.edu, Vitamin E, <https://www.hsph.harvard.edu/nutritionsource/vitamin-e/> (Year: 2022).*

Barley, Basic Principles of Freeze Drying, SP Scientific, Captured Oct. 5, 2017 <http://web.archive.org/web/20171005122840/https://www.spscientific.com/freeze-drying-lyophilization-basics/> (Year: 2017).*

Nieto et al., Antioxidant and Antimicrobial Properties of Rosemary (*Rosmarinus officinalis*, L.): A Review, NIH. Sep. 4, 2018 <https://www.ncbi.nlm.nih.gov/pmc/articles/PMC6165352/> (Year: 2018).*

R. Ribeiro-Santos, et al; A novel insight on an ancient aromatic plant: The rosemary (*Rosmarinus officinalis* L.); Trends in Food Science & Technology; vol. 45; 2015; pp. 355-368.

EFSA, 2008a; Use of rosemary extracts as a food additive; The EFSA Journal; vol. 721; 2008; pp. 1-29.

N. Okamura, et al; High-performance liquid chromatographic determination of carnosic acid and carnosol in Rosmarinus officinalis and Salvia officinalis; Journal of Chromatography A, 679; 1994; pp. 381-386.

G. Zgorka, et al; Variation of free phenolic acids in medicinal plants belonging to the Lamiaceae family; Journal of Pharmaceutical and Biomedical Analysis; vol. 26; 2001; pp. 79-87.

G. P. Amaral, et al; Protective action of ethanolic extract of *Rosmarinus officinalis* L. in gastric ulcer prevention induced by ethanol in rats; Food and Chemical Toxicology; vol. 55; 2013; pp. 48-55.

M. Carocho, et al; Adding molecules to food, pros and cons: A review on synthetic and natural food additives; Comprehensive Reviews in Food Science and Food Safety; vol. 13; 2014; pp. 377-399.

H. Cheng, et al; Partition of selected food preservatives in fish oil-water systems; Food Chemistry; vol. 122; 2010; pp. 60-64.

EFSA, 2008b; Regulation (EC) No. 1333/2008 of the European Parliament and of the Council of Dec. 16, 2008 on food additives; Official Journal of the European Union; L 354/16-L 354/33; 18 pages.

EFSA, 2015; Extension of use of extracts of rosemary (E392) in fat-based spreads; EFSA Panel on Food Additives and Nutrient Sources added to Food (ANS); EFSA Journal; 2015; 22 pages.

S. Rodriguez-Rojo, et al; Assisted extraction of rosemary antioxidants with green solvents; Journal of Food Engineering; vol. 109; 2012; pp. 98-103.

M. Jacotet-Navarro, et al; Ultrasound versus microwave as green processes for extraction of rosmarinic, carnosic and ursolic acids from rosemary; Ultrasonics Sonochemistry; vol. 27; 2015; pp. 102-109.

G. A. R. Oliveira, et al; Multiresponse optimization of an extraction procedure of carnosol and rosmarinic and carnosic acids from rosemary; Food Chemistry; vol. 211; 2016; pp. 465-473.

L. A. Conde-Hernandez, et al; CO2-supercritical extraction, hydrodistillation and steam distillation of essential oil of rosemary (*Rosmarinus officinalis*); Journal of Food Engineering; vol. 200; 2017; pp. 81-86.

S. Birtic, et al; Carnosic acid; Phytochemistry; vol. 115; 2015; pp. 9-19.

J. H. Chen, et al; Antioxidant activities of caffeic acid and its related hydroxycinnamic acid compounds; Journal of Agriculture and Food Chemistry; vol. 45; 1997; pp. 2374-2378.

M. Carocho, et al; Antioxidants: Reviewing the chemistry, food applications, legislation and role as preservatives; Trends in Food Science and Technology; vol. 71; 2018; pp. 107-120.

E. Tavassoli-Kafrani, et al; Development of edible films and coatings from alginates and carrageenans; Carbohydrate Polymers; vol. 137; 2016; pp. 360-374.

A. Ribeiro, et al; Rosemary extracts in functional foods: extraction, chemical characterization and incorporation of free and microencapsulated forms in cottage cheese; Food and Function; vol. 7; 2016; pp. 2185-2196.

\* cited by examiner

OBTENTION OF A SOLUTION FROM EXTRACTS OF *ROSMARINUS OFFICINALIS* L. FOR USE AS A FOOD COATING

CROSS-REFERENCE TO RELATED APPLICATIONS

This application claims the benefit of priority of Portuguese application No. 110859 filed Jul. 18, 2018, the contents of which is incorporated herein by reference.

TECHNICAL FIELD

The present invention describes the process to obtain a liquid solution for foods having the extract of rosemary (*Rosmarinus officinalis* L.) as the main agent, which is obtained through an infusion, and is intended to be used as a coating agent for food, as an alternative to plastic wraps and other plastics technologies.

*Rosmarinus officinalis* L., known commonly as rosemary, is a medicinal and aromatic bushy plant, native to Asia and the Mediterranean basin belonging to the Lameaceae family, with about 20 identified varieties (Ribeiro-Santos et al., 2015). This plant has always had an importance in human feed, being used for centuries in infusions. Its traditional use is associated with the relief of head and abdominal pains, as well as alleviating spasms, arthritis, gout, rheumatism, and is also known as a natural antidepressant, antimicrobial and antioxidant, among others (Ribeiro-Santos et al., 2015). Since 2008, the European Food Safety Authority (EFSA) allowed the extracts of these plants to be used as a food additive, namely as a preservative, attributing E392 as its E number (EFSA Journal, 2008a). Since then, its use as a food preservative has been expanded to various types of foods, namely oils and derivatives, baked goods, sauces, soups, meat products, fish, food supplements, among others.

Chemically, rosemary leaves has a wide variety of compounds from the secondary metabolism of plants, namely phenolic compounds and terpenes, being the most abundant ones, two phenolic diterpenes, carnosol and carnosic acid, which are mainly responsible for the antimicrobial potential, and the third most abundant component the rosmarinic acid, a phenolic acid (Okamura et al., 1994; Zgórka and Glowniak, 2001; Amaral et al., 2013).

In this invention the compounds of interest from the aerial parts of rosemary are extracted by means of an infusion, that after being lyophilized are then added to other ingredients, namely calcium chloride, α-tocopherol, ascorbic acid, glycerol and iota carrageenan to create a viscous solution that will adhere to the foodstuff.

The coating created after contact with the foodstuff protects it from oxidation induced by oxygen in the air, reduces dehydration and color changes, and finally protects against microorganism proliferation on the surface of the foodstuff.

STATE OF THE ART

Recent studies point towards a paradigm shift in the ways that consumers in developed countries feel towards the food they buy. They are increasingly becoming better informed of their choices and tend to prefer unprocessed or minimally processed foods. Still, when they must buy processed food, they prefer that the additives used are from a natural origin rather than synthetic or artificial counterparts (Carocho et al., 2015).

The conservation of food is a critical feature in society, provided that food is produced in distant locations, far from the ones they are processed, sold and consumed, relying on preservation strategies to maintain their nutritional quality, visual appearance, freshness and contaminant free status (Cheng et al., 2010). Many of the preservation strategies during transport and storage rely on low temperatures or protective atmospheres to reduce food degradation, while to shelve food in storage or at the household level food additives are the preferred method (Carocho et al., 2015). To the EFSA, food additives are considered molecules or extracts that are not usually consumed as food, and are added to it in order to serve a technological purpose, namely to preserve, color, sweeten, change the physical or chemical properties of food, and other purposes (EFSA Journal, 2008b). In this regulation, although there is not a physical separation between natural and artificial additives, the quest for natural alternatives by the scientific community and the demand for them by the industry and consumers is notorious. Thus, the rosemary extract (E392) which is already allowed to be used, has many forms of extraction, namely through ethanolic solutions, hexane or supercritical carbon dioxide. This preservative is already used within the European Union and has increased its use spectrum since its first approval (EFSA Journal, 2015).

Cheaper and more sustainable methods of extraction of these compounds from rosemary has been pursued for many years (Rodrigues-Rojo et al., 2012; Jacoter-Navarro et al., 2015; Oliveira et al., 2016; Cende-Hernández et al., 2017). Carnosol is the oxidized form of carnosic acid (FIG. 1), and both present antioxidant capacity, especially in foods with high fat content, due to their lipidic affinity. This antioxidant capacity is similar to the one found in tocopherols, relying on the two hydroxyl groups of the catechol half (Bitrić et al., 2015). Rosmarinic acid (FIG. 1), another phenolic compound found in rosemary, beyond having a higher resistance to light, temperature and solvents, has not only antioxidant capacity, but also antimicrobial. Like other phenolic compounds, its antioxidant activity is due to the hydroxyl groups, but, unlike other natural antioxidants which only usually have one or two of these groups, rosmarinic acid has four, which can explain its high antioxidant power (Cheng and Ho, 1997).

Other antioxidants with applicability in food are ascorbic acid (FIG. 2) and tocopherols (FIG. 3). Ascorbic acid, vitamin C, is an industrially produced antioxidant based on the molecule found in many animals and plants that, deters oxidation of tissues, beyond other functions. Thus, its use in the preservation of foodstuffs is quite broad, being already used as an additive (E300). Ascorbic acid works alone or in association with other antioxidants, namely tocopherols. These eight molecules (α-, β-, γ- e δ-tocopherol e α-, β-, γ- e δ-tocotrienol) are lipophilic antioxidants that after they excerpt their antioxidant effect are regenerated by ascorbic acid in a biochemical synergy. α-tocopherol which is the most active isoform and also considered an additive by EFSA (E307) is obtained naturally from vegetable oils (Carocho et al., 2018). Carrageenan is a natural hydrophilic polymer obtained from red marine algae. It displays a linear chain with partially sulphated galactanes. Among the three types of carrageenan (kappa, iota and lambda), the one that displays the best capacity to form polymers which are ideal to coat foods is iota. Carrageenans are also used in the food industry as the E407 additive (Tavassoli-Kafrani et al., 2016). Another ingredient used in the food industry is glycerol, also known as glycerin, which has interesting plastifying properties to thicken foods (E422).

BRIEF SUMMARY OF THE INVENTION

To obtain the coating solution the aerial parts of rosemary where used, which were bought in a dry form from producing enterprises. The plant is mechanically milled to obtain a homogeneous powder with particle sizes ranging from 0.5 to 2 µm. An infusion is then carried out using 20 to 40 grams of plant for each litre of water at a temperature between 85 to 105° C. during 3 to 10 minutes that after being filtered is lyophilized until obtaining a dry extract. The composition of the rosemary extract has been previously described in Food Funct., 7, 2185-2196.

Then, the coating solution is prepared under vigorous and constant stirring. The rosemary extract is added to the water in a concentration between 5 to 10 g/L followed by the addition of 1 to 8 g/L of ascorbic acid. A quantity between 1 and 8 g/L of α-tocopherol is dissolved in 10 to 20 mL of absolute ethanol and is then added to the coating solution, followed by 5 to 15 g/L of calcium chloride and 30 to 70 g/L of glycerol. After completing the solution of all these components, iota carrageenan is added at a concentration of 10 to 15 g/L. The solution is then heated between 20 to 50° C. for 20 to 50 minutes for the complete dissolution of the polymer and incorporation of the other compounds into its structure.

DETAILED DESCRIPTION OF THE INVENTION

Figure 1:
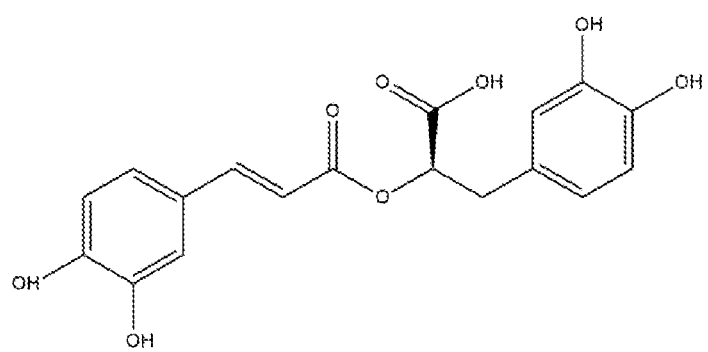
FIG. 1. Chemical structure of the compounds: a) rosmarinic acid, b) carnosol and c) carnosic acid.
Figure 1:
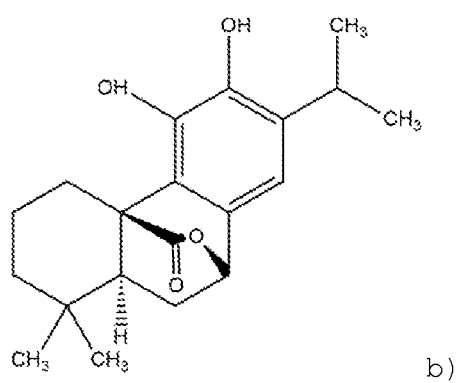
Figure 1:
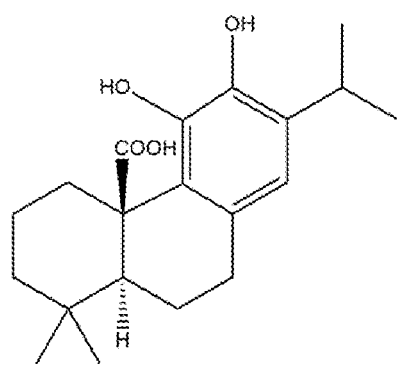
Figure 2:
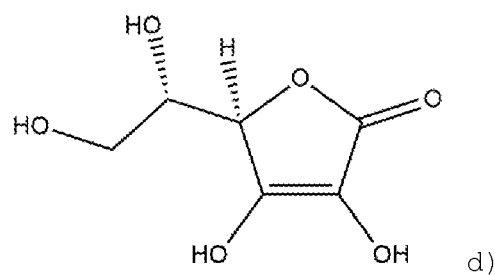
FIG. 2. Chemical structure of the solution ingredients: d) ascorbic acid (vitamin C), e) α-tocopherol (isoform of vitamin E), f) glycerol and g) iota carrageenan.
Figure 2:
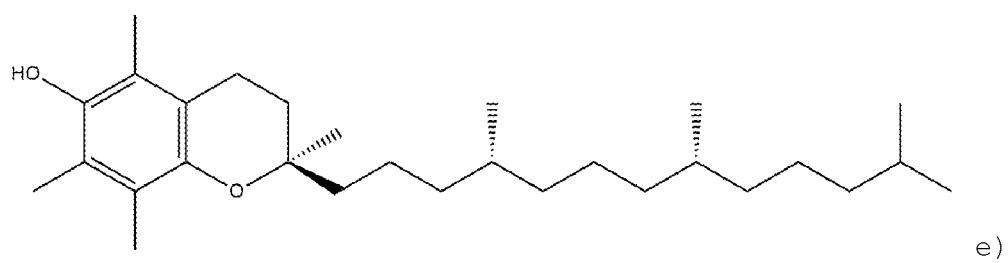
Figure 2:
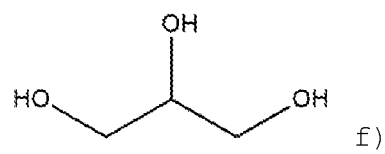
Figure 2:
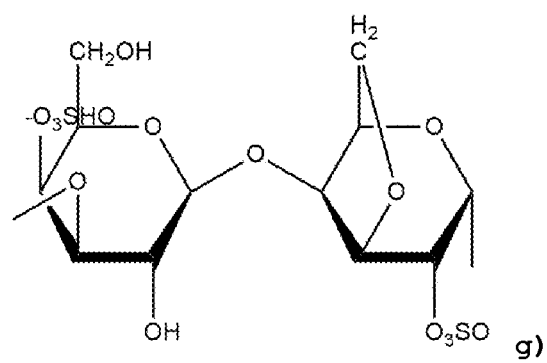
Figure 3:
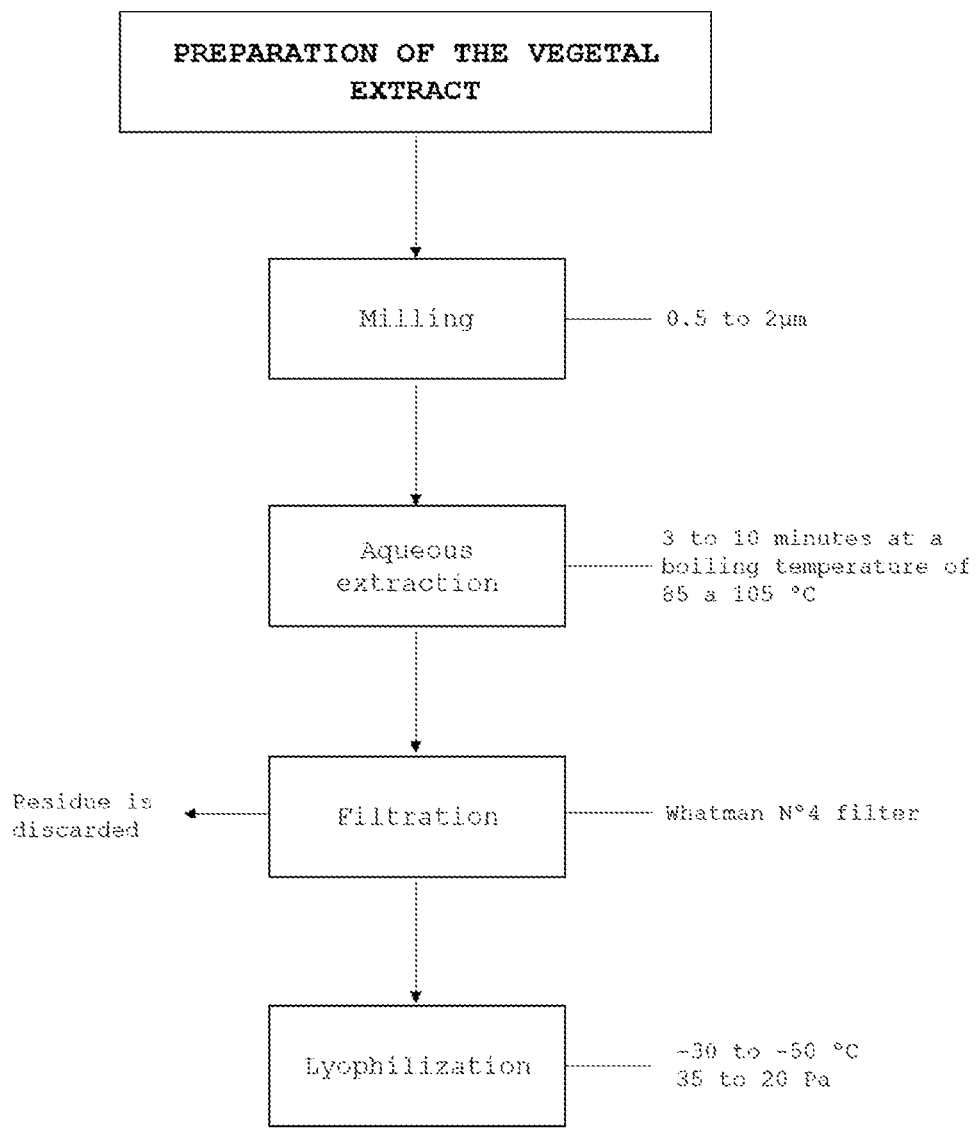
FIG. 3. Process to obtain the rosemary extracts where the aerial parts of the plant are milled and then subject to hot water extraction. The solution is then filtered and lyophilized, resulting in a dry residue.
Figure 4:
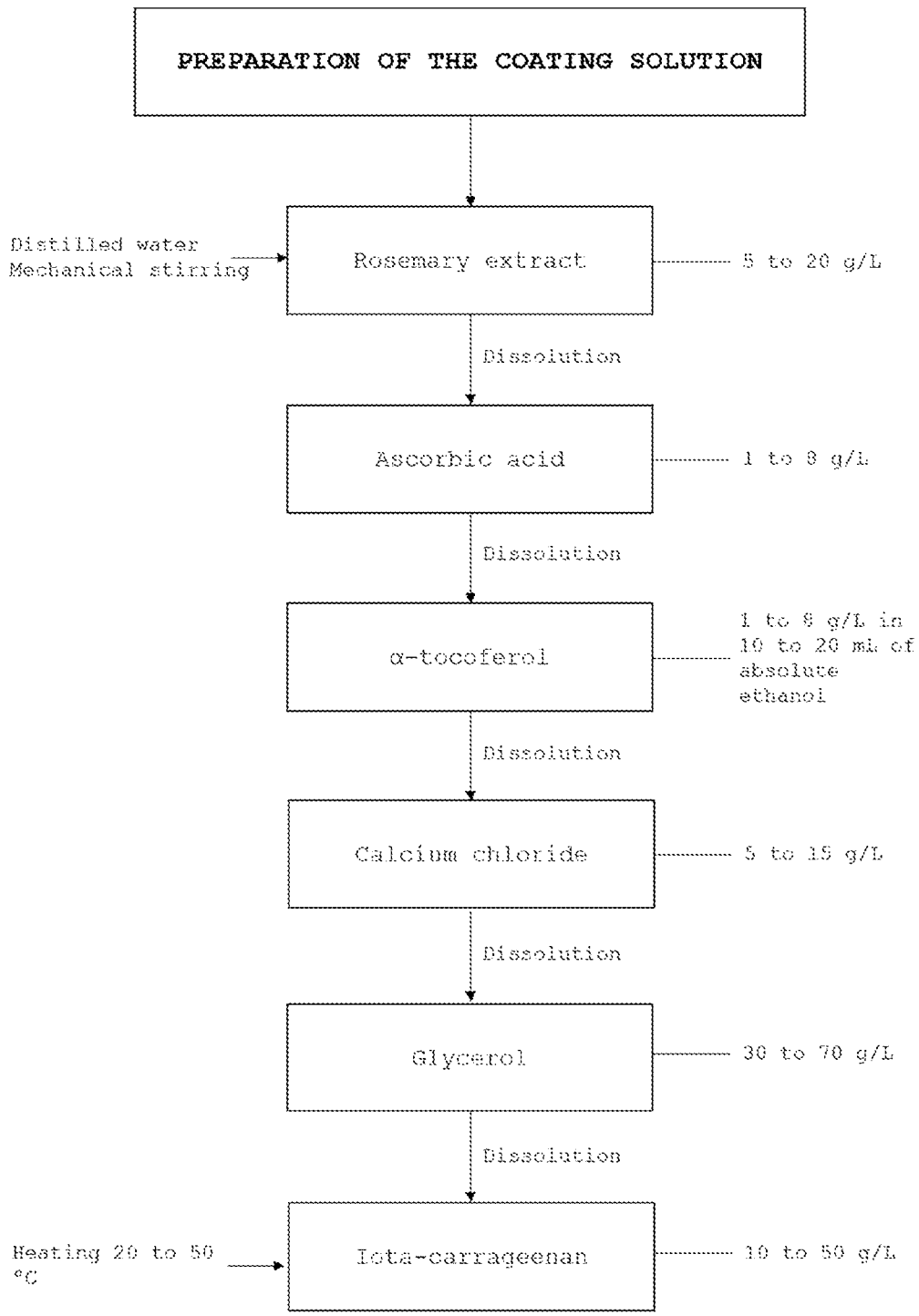
FIG. 4. Process of the coating solution preparation, where the obtained extract described in FIG. 3 is dissolved in water and maintained in mechanical stirring, to which then ascorbic acid, α-tocopherol, calcium chloride, glycerol and, finally, iota carrageenan are added create the polymeric coating.

The first objective is the obtention of the rosemary extract through an aqueous extraction. For this, the aerial parts are milled to obtain a fine homogenous powder with particle sizes between 0.5 and 2 µm. Then, the powder is subjected to an extraction with boiling water (85 to 105° C.) for 3 to 10 minutes, filtered through a Whatman filter and lyophilized at a temperature between −30 and −50° C. and 3.5 to 20 Pa of pressure.

The second objective is to obtain the coating solution based on the rosemary extract obtained in the previous objective. The extract obtained in the previous objective is added to distilled water at a concentration between 5 and 15 g/L. After complete dissolution, ascorbic acid is added (1 to 8 g/L), as well as 1 to 8 g/L of α-tocopherol previously dissolved in 10 to 20 mL of absolute ethanol and added to the coating solution until complete dissolution. The last ingredients to be added are calcium chloride (5 to 15 g/L), glycerol (30 to 70 g/L), and iota carrageenan at 10 to 15 g/L heating the solution between 20 to 50° C. for 20 to 50 minutes until the solution, forming the coating solution.

In one form of preparation, the coating solution is used as a food coating through immersion.

In another form of preparation, the coating solution is used as a food coating as an aerosol (spray).

REFERENCES

Ribeiro-Santos, R., Carvalho-Costa, D., Cavaleiro, C., Costa, H. S., Albuquerque, T. G., Castilho, M. C., Ramos, F., Melo, N. R., & Sanches-Silva, A. (2015). A novel insight on an ancient plant: The rosemary (*Rosmarinus officinalis* L.). Trends in Food Science & Technology, 45, 355-368.

EFSA, 2008a. Use of rosemary extracts as food additive. The EFSA Journal 721, 1-29.

Okamura, N., Fujimoto, Y., Kuwabara, S., & Yagi, A. (1994). High-performance liquid chromatographic determination of carnosic acid and carnosol in *Rosmarinus officinalis* and *Salvia officinalis*. Journal of Chromatography A, 679, 381-386.

Zgórka, G., & Gowniak, K. (2001). Variation of free phenolic acids in medicinal plants belonging to the Lamiaceae family. Journal of Pharmaceutical and Biomedical Analysis, 26, 79-87.

Amaral, G. P., Carvalho, N. R., Barcelos, R. P., Dobrachinski, F., Portella, R. L., Silva, M. H., Lugokenski, T. H., Dias, G. R. M., Luz, S. C. A., Boligon, A. A., Athayde, M. L., Villetti, M. A., Soares, F. A. A., & Fachinetto, R. (2013). Food and Chemical Toxicology, 55, 48-55.

Carocho, M., Barreiro, M. F., Morales, P., & Ferreira, I. C. F. R. (2014). Adding molecules to food, pros and cons: A review on synthetic and natural food products. Comprehensive Reviews in Food Science and Food Safety, 13, 377-399.

Cheng, H., Friis, A., & Leth, T. (2010). Partition of selected food preservatives in fish oil-water systems. Food Chemistry, 122, 60-64.

EFSA, 2008b. Jornal Oficial da União Europeia, Regulamento N° 1333/2008 do Parlamento Europeu e do Conselho de 16 de dezembro de 2008 relativo aos aditivos alimentares. L 354/16.

EFSA, 2015. Extension of use of extracts of rosemary (E392) in fat-based spreads. EFSA Panel on Food Additives and Nutrients Sources added to Food (ANS).

Rodriguez-Rojo, S., Visentin, A., Maestri, D., & Cocero, M. J. (2012). Assisted extraction of rosemary antioxidants with Green solvents. Journal of Food Engineering, 109, 98-103.

Jacotet-Navarro, M., Rombaut, N., Fabiano-Tixier, A. S., Danguien, M., Bily, A., & Chemat, F. (2015). Ultrasound versus microwave as green processes for extraction of rosmarinic, carnosic and ursolic acids from rosemary. Ultrasonics Sonochemistry, 27, 102-109.

Oliveira, G. A. R., Oliveira, A. E., Conceição, E. C., & Leles, M. I. G. (2016). Multiresponse optimization of an extraction procedure of carnosol and rosmarinic and carnosic acids from rosemary. Food Chemistry, 211, 465-473.

Conde-Hernández, L. A., Espinosa-Victoria, J. R., Trejo, A., & Guerrero-Beltrán, J. A. (2017). $CO_2$-supercritical extraction, hydrodistillation and steam distillation of essential oil of rosemary (*Rosmarinus officinalis*). Journal of Food Engineering, 200, 81-86.

Bitrić, A., Dussort, P., Pierre, F., Bily, A. C., & Roller, M. (2015). Carnosic acid. Phytochemistry, 115, 9-19.

Cheng, J. H., & Ho, C. (1997). Antioxidant activities of caffeic acid and its related hydroxycinnamic acid compounds. Journal of Agriculture and Food Chemistry, 45, 2374-2378.

Carocho, M., Morales, P., & Ferreira, I. C. F. R. (2018). Antioxidants: Reviewing the chemistry, food applications, legislation and role as preservatives. Trends in Food Science and Technology, 71, 107-120.

Tavassoli-Kafrani, E., Shekarchizadeh, H., & Masoudpour-Behabadi, M. (2016). Development of edible film and coatings from alginates and carrageenans. Carbohydrate Polymers, 137, 360-374.

Ribeiro, A., Caleja, C., Barros, L., Santos-Buelga, C., Barreiro, M. F., & Ferreira, I. C. F. R. (2016). Rosemary extracts in functional foods: extraction, chemical characterization and incorporation of free and microencapsulated forms in cottage cheese. Food and Function, 7, 2185-2196.

The invention claimed is:

1. A process of obtaining a solution from the extracts of *Rosmarinus officinalis* L. for use as a food coating, comprising the following steps:
    a) extracting the compounds of the *Rosmarinus officinalis* L. by:
        obtaining *Rosmarinus officinalis* L. leaves and mechanically milling the leaves to obtain a homogeneous powder with particle sizes ranging from 0.5 to 2 μm;
        infusing the homogeneous powder in water to obtain a solution infused with the homogenous powder; and
        lyophilizing the solution infused with the homogenous powder in order to obtain a dry extract;
    b) preparing a coating solution under constant stirring by:
        adding the dry extract obtained in step a) to distilled water until completely dissolving the dry extract in the distilled water;
        adding ascorbic acid to the dry extract dissolved in distilled water to obtain a solution of ascorbic acid and dry extract dissolved in distilled water;
        dissolving a-tocopherol in absolute ethanol, thereafter adding the dissolved a-tocopherol in absolute ethanol to the solution of ascorbic acid and dry extract dissolved in distilled water to obtain a solution of a-tocopherol, ascorbic acid and dry extract dissolved in distilled water;
        adding calcium chloride and glycerol;
        adding iota carrageenan; and
        heating until complete dissolution of the iota carrageenan, the calcium chloride, the glycerol, and the solution of a-tocopherol, ascorbic acid, and dry extract in distilled water to obtain the coating solution.

2. The process according to claim 1, wherein the infusing step is carried out between 3 and 10 minutes in boiling water between 85 and 105° C.

3. The process according to claim 1, wherein the dry extract is lyophilized at a temperature between −30 and −50° C. and a pressure between 3.5 and 20 Pa.

4. The process according to claim 1, wherein the heating is carried out between 20 and 50° C. for 20 to 50 minutes, and wherein the obtained coating solution comprises:
    the dry extract at a concentration between 5 and 15 g/L;
    the ascorbic acid at a concentration between 1 and 8 g/L;
    the a-tocopherol at a concentration between 1 and 8 g/L, wherein the α-tocopherol is previously dissolved in 10 to 20 mL of the absolute ethanol;
    the calcium chloride at a concentration between 5 and 15 g/L;
    the glycerol at a concentration between 30 and 70 g/L; and,
    the iota carrageenan at a concentration between 10 and 50 g/L.

* * * * *